(12) United States Patent
Reynolds et al.

(10) Patent No.: US 10,073,560 B2
(45) Date of Patent: Sep. 11, 2018

(54) DIFFERENTIAL FORCE AND TOUCH SENSING

(71) Applicant: SYNAPTICS INCORPORATED, San Jose, CA (US)

(72) Inventors: Joseph Kurth Reynolds, San Jose, CA (US); Kasra Khazeni, San Jose, CA (US)

(73) Assignee: SYNAPTICS INCORPORATED, San Jose, CA (US)

( * ) Notice: Subject to any disclaimer, the term of this patent is extended or adjusted under 35 U.S.C. 154(b) by 0 days.

(21) Appl. No.: 15/582,272

(22) Filed: Apr. 28, 2017

(65) Prior Publication Data

US 2017/0315662 A1 Nov. 2, 2017

Related U.S. Application Data

(60) Provisional application No. 62/330,042, filed on Apr. 29, 2016.

(51) Int. Cl.
*G06F 3/041* (2006.01)
*G06F 3/044* (2006.01)

(52) U.S. Cl.
CPC .......... *G06F 3/0416* (2013.01); *G06F 3/044* (2013.01); *G06F 3/0412* (2013.01); *G06F 3/0414* (2013.01); *G06F 2203/04106* (2013.01)

(58) Field of Classification Search
CPC ...... G06F 3/0416; G06F 3/0414; G06F 3/044; G06F 3/0412; G06F 2203/04106
See application file for complete search history.

(56) References Cited

U.S. PATENT DOCUMENTS 5,510,813 A 4/1996 Makinwa et al.
5,942,733 A 8/1999 Allen et al.
(Continued)

FOREIGN PATENT DOCUMENTS

WO WO-2008085719 A2 7/2008

OTHER PUBLICATIONS

Hughes, Neil. 'Force Touch for iPhone expected to bring about most significant change yet to IOS user interface'. In appleinsider [online]. Apr. 2, 2015; Retrived from the Internet: <URL: http://appleinsider.com/articles/15/04/02/force-touch-for-iphone-expected-to-bring-about-mostsignificant-change-to-ios-user-interface-yet>. See pp. 1-2; and figure 2.
(Continued)

*Primary Examiner* — Shaheda Abdin
(74) *Attorney, Agent, or Firm* — Patterson + Sheridan, LLP

(57) ABSTRACT

An input device is configured to detect force being applied to an input region of the device by an input object, in addition to the position of the input object using touch sensing methods. Aspects include driving a force sensing electrode of the input device using an anti-guarding voltage alternating with a ground or guard voltage, while driving the touch sensing electrodes with a reference voltage, to obtain touch measurements, force measurements, interference measurements, double the force signal, and/o double the touch signal for differential touch and force detection. Aspects also include driving sensor electrodes using orthogonal signals and performing in-phase and quadrature demodulation of the received signal for simultaneous and independent touch and force measurements.

20 Claims, 11 Drawing Sheets

(56) References Cited

U.S. PATENT DOCUMENTS

| | | | |
|---|---|---|---|
| 5,943,044 A | 8/1999 | Martinelli et al. |
| 6,002,389 A | 12/1999 | Kasser |
| 7,154,481 B2 | 12/2006 | Cross et al. |
| 7,215,329 B2 | 5/2007 | Yoshikawa et al. |
| 7,395,717 B2 | 7/2008 | Deangelis et al. |
| 7,538,760 B2 | 5/2009 | Hotelling et al. |
| 7,825,911 B2 | 11/2010 | Sano et al. |
| 8,063,886 B2 | 11/2011 | Serban et al. |
| 8,607,651 B2 | 12/2013 | Eventoff |
| 8,627,716 B2 | 1/2014 | Son |
| 8,686,952 B2 | 4/2014 | Burrough et al. |
| 8,730,199 B2 | 5/2014 | Sleeman et al. |
| 8,857,274 B2 | 10/2014 | Mamigonians |
| 9,075,095 B2 | 7/2015 | Kallassi et al. |
| 2003/0067447 A1* | 4/2003 | Geaghan ............... G06F 3/0416 345/173 |
| 2004/0090429 A1 | 5/2004 | Geaghan et al. |
| 2006/0260417 A1 | 11/2006 | Son et al. |
| 2007/0163815 A1 | 7/2007 | Ungaretti et al. |
| 2007/0229464 A1 | 10/2007 | Hotelling et al. |
| 2007/0236466 A1 | 10/2007 | Hotelling |
| 2008/0062148 A1 | 3/2008 | Hotelling et al. |
| 2008/0136792 A1* | 6/2008 | Peng ..................... G06F 3/0416 345/174 |
| 2008/0174321 A1 | 7/2008 | Kang et al. |
| 2010/0053107 A1 | 3/2010 | Tsuzaki et al. |
| 2010/0242629 A1 | 9/2010 | Leuenberger et al. |
| 2010/0253651 A1 | 10/2010 | Day |
| 2010/0282000 A1 | 11/2010 | Gorjanc et al. |
| 2011/0007023 A1 | 1/2011 | Abrahamsson et al. |
| 2011/0096025 A1 | 4/2011 | Slobodin et al. |
| 2011/0141053 A1 | 6/2011 | Bulea et al. |
| 2011/0227872 A1 | 9/2011 | Huska et al. |
| 2011/0278078 A1 | 11/2011 | Schediwy et al. |
| 2012/0013573 A1 | 1/2012 | Liu et al. |
| 2012/0025876 A1 | 2/2012 | Kimura |
| 2012/0038583 A1 | 2/2012 | Westhues et al. |
| 2012/0062245 A1 | 3/2012 | Bao et al. |
| 2012/0105367 A1 | 5/2012 | Son et al. |
| 2012/0274599 A1 | 11/2012 | Schediwy |
| 2012/0299866 A1 | 11/2012 | Pao et al. |
| 2013/0016059 A1 | 1/2013 | Lowles et al. |
| 2013/0047747 A1 | 2/2013 | Joung |
| 2013/0068038 A1 | 3/2013 | Bolender et al. |
| 2013/0076646 A1 | 3/2013 | Krah et al. |
| 2013/0099802 A1 | 4/2013 | Hsieh et al. |
| 2013/0234977 A1 | 9/2013 | Lin et al. |
| 2013/0265256 A1 | 10/2013 | Nathan et al. |
| 2014/0002113 A1 | 1/2014 | Schediwy et al. |
| 2014/0028575 A1 | 1/2014 | Parivar et al. |
| 2014/0062934 A1 | 3/2014 | Coulson et al. |
| 2014/0085213 A1 | 3/2014 | Huppi et al. |
| 2014/0085247 A1 | 3/2014 | Leung et al. |
| 2014/0226083 A1 | 8/2014 | Dunphy et al. |
| 2014/0247239 A1 | 9/2014 | Jamshidi-Roudbari et al. |
| 2014/0267128 A1 | 9/2014 | Bulea et al. |
| 2014/0267134 A1 | 9/2014 | Bulea et al. |
| 2014/0307186 A1 | 10/2014 | Yun et al. |
| 2015/0002447 A1 | 1/2015 | Schediwy |
| 2015/0009171 A1 | 1/2015 | Shepelev |
| 2015/0015475 A1 | 1/2015 | Ely et al. |
| 2015/0070285 A1 | 3/2015 | Qiu |
| 2015/0084909 A1 | 3/2015 | Worfolk et al. |
| 2015/0130734 A1 | 5/2015 | Chang et al. |
| 2015/0268784 A1 | 9/2015 | Kallassi et al. |
| 2016/0092015 A1 | 3/2016 | Al-Dahle et al. |
| 2016/0117036 A1 | 4/2016 | Sleeman, Jr. et al. |

OTHER PUBLICATIONS

International Search Report and Written Opinion PCT/US2016/028307, dated Jul. 29, 2016 consists of 17 pages.
International Search Report and Written Opinion PCT/US2017/030192, dated Sep. 19, 2017 consists of 12 pages.

* cited by examiner

DIFFERENTIAL FORCE AND TOUCH SENSING

CROSS-REFERENCE TO RELATED APPLICATION(S)

This application claims the benefit of U.S. Provisional Application No. 62/330,042, filed Apr. 29, 2016, the entire contents of which are incorporated by reference herein.

BACKGROUND

Field of the Disclosure

Aspects of this disclosure generally relate to capacitive sensing and, more particularly, sensing touch and force on an input surface using capacitive sensing.

Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Some input devices have integrated force sensors. However, most force sensor integrations require dedicated force sensor electrodes and associated routing. The force sensor electrodes and associated routing undesirably add manufacturing and material cost for fabrication of the input device, and often undesirably add to the thickness and or size of the touch and/or force sensing components. Moreover, adding routing for additional force sensor electrodes undesirably consumes space within the input device, thus leaving less space available for other components which may reduce functionality. However, one problem with combining sensors is distinguishing between the touch signal and the force signal.

Thus, there is a need for an improved input device that allows differentiating between the touch and force signals, thereby enabling touch and force sensing. Techniques for simultaneous touch and force sensing are also desirable.

SUMMARY

This disclosure generally provides input devices, processing systems and methods for differential touch and force sensing using anti-guarding and simultaneous touch and force sensing using both in-phase and quadrature (I/O) demodulation. Techniques herein allow for narrow bandwidth sensing since they reduce latency of reporting and increase the accuracy of correlation between the touch and force signals for fast motions (e.g., relative to the sensor pitch and report rate).

Aspects of the present disclosure provide an input device. The input device includes an input surface; at least one force electrode; a plurality of sensor electrodes disposed between the input surface and the at least one force electrode, the plurality of sensor electrodes configured to deflect toward the at least one force electrode in response to a force applied to the input surface; and a processing system coupled to the plurality of sensor electrodes, the processing system configured to: drive the plurality of sensor electrodes with a modulated reference voltage; while driving the plurality of sensor electrodes with the modulated reference voltage, drive the at least one force electrode by alternating between a guarding voltage modulation and an anti-guarding voltage modulation, wherein the guarding voltage modulation is in-phase with respect to the modulated reference voltage, and wherein the anti-guarding voltage is out of phase with respect to the modulated reference voltage; receive resulting signals comprising effects of user input upon the coupling of at least one of the modulated reference voltage, the guarding voltage, or the anti-guarding voltage, the effects indicative of changes in capacitance of the plurality of sensor electrodes; and determine both position information and force information for an input object based on at least two of the resulting signals.

Aspects of the present disclosure provide a processing system for an input device. The processing system includes sensor circuitry configured to: acquire first resulting signals by driving a plurality of sensor electrodes with a first modulated voltage, the plurality of sensor electrodes disposed between an input surface of the input device and a force electrode and configured to deflect toward the force electrode in response to a force applied to the input surface; and acquire a second resulting signal, while the plurality of sensor electrodes are driven with the first modulated voltage, by driving the force electrode with a second modulated voltage, wherein the second modulated voltage is partially out of phase (e.g., 90 degrees) with respect to the first modulated voltage; and a determination module, coupled to the sensor circuitry, configured to: determine positional information for an input object based on the first and second resulting signals; and determine force information for the input object based on the second resulting signal.

BRIEF DESCRIPTION OF THE DRAWINGS

So that the manner in which the above recited features of the present disclosure can be understood in detail, a more particular description of the disclosure, briefly summarized above, may be had by reference to aspects, some of which are illustrated in the appended drawings. It is to be noted, however, that the appended drawings illustrate only typical aspects of this disclosure and are therefore not to be considered limiting of its scope, for the disclosure may admit to other equally effective aspects.

Figure 1:
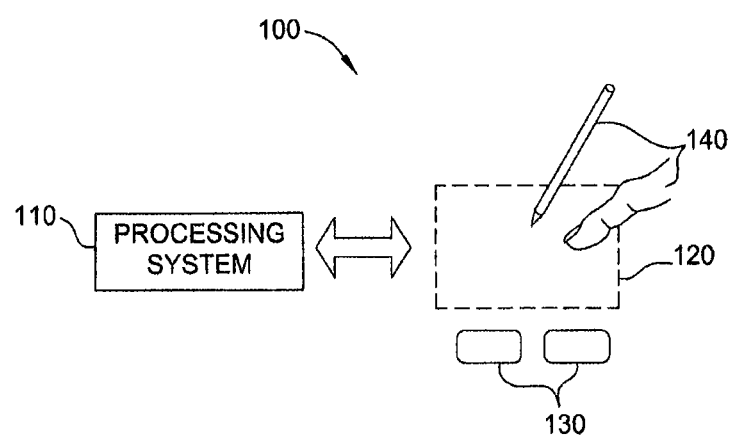
FIG. 1 is a block diagram of an exemplary input device, according to one aspect described herein.

To facilitate understanding, identical reference numerals have been used, where possible, to designate identical elements that are common to the figures. It is contemplated that elements disclosed in one aspect may be beneficially utilized on other aspects without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the disclosure or its application and uses. Furthermore, there is no intention to be bound by any expressed or implied theory presented in the preceding technical field, background, brief summary or the following detailed description.

Various aspects of the present disclosure provide input devices, processing systems and methods for differential touch sensing and force sensing using guarding, anti-guarding and for simultaneous touch and force sensing using orthogonal sensing signals in-phase and quadrature (i.e., I/Q) demodulation. As utilized herein, capacitive sensing is described as a touch sensing technique utilizing information received from capacitive sensor electrodes at least some of which may be combination electrodes used for both capacitive touch sensing and display updating, while force sensing is described as utilizing information transmitted by force sensor electrodes to determine force that an input object exerts against the input device.

Input devices having a force detector are generally based on a bending effect caused by a force applied to the input device by an input object. The bending results in a deflection from equilibrium of at least a portion of the sensor electrodes in the input device. For example, in some aspects, the deflection of sensor electrode(s) due to the applied force changes the distance between at least one of the sensor electrodes and the one or more force electrodes, which can be detected as a change in capacitance. Due to the mechanical nature of the bending effect, the same force applied at different positions on the input surface can report different force levels. For example, force sensor data corresponding to the center of the input surface may be elevated relative to data from the edges or corners of the input surface. To address this problem, position compensation is applied when determining force level information using the force sensor data. Where off-screen capacitive buttons are present force information may also be extracted based on the location of the user input on the button and the effect of force sensed by the system within the sensing region 120.

However, distinguishing between touch and force signals can be difficult. Accordingly, aspects of the present disclosure provide a processing system that uses different modulation phases for independently measuring force and touch signals. For example, guarding and anti-guarding signals to double the signal for differential touch and force sensing or in-phase and quadrature demodulation for simultaneous and independent touch and force measurements.

FIG. 1 is a block diagram of an exemplary input device 100, in accordance with aspects of the disclosure. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), MIPI DSI, eDP-AUX channel, Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc. In some embodiments, the sensing region 120 has a rectangular shape when projected onto an input surface of the input device 100. In some embodiments with combination electrodes the sensing region 120 may be defined by the display region.

The input device 100 may utilize any combination of sensor components and sensing technologies to detect user input in the sensing region 120. The input device 100 comprises one or more sensing elements for detecting user input. As several non-limiting examples, the input device 100 may use capacitive, elastive, resistive, inductive, magnetic, acoustic, ultrasonic, and/or optical techniques.

Some implementations are configured to provide images that span one, two, three, or higher dimensional spaces. Some implementations are configured to provide projections of input along particular axes or planes.

In some capacitive implementations of the input device 100, voltage or current is applied to create an electric field. Nearby input objects cause changes in the electric field, and produce detectable changes in capacitive coupling that may be detected as changes in voltage, current, accumulated charge, or the like.

Some capacitive implementations utilize arrays or other regular or irregular patterns of capacitive sensing elements to create electric fields. In some capacitive implementations, separate sensing elements may be ohmically shorted together to form larger sensor electrodes. Some capacitive implementations utilize resistive sheets, which may be uniformly resistive, metal mesh, Indium Tin Oxide (ITO), etc.

Some capacitive implementations utilize "self-capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes" or "transmitters") and one or more receiver sensor electrodes (also "receiver electrodes" or "receivers"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) due to user input coupling corresponding to one or more transmitter signals, and/or to one or more sources of environmental interference (e.g. other electromagnetic signals). Sensor electrodes may be dedicated transmitters or receivers, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions. In some embodiments, some part of the system responds to a measurement of interference to select a sensing frequency.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. The buttons 130 may be capacitively sensed and force data may be combined with button location and activation data to determine reporting (e.g. intentional button press). Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display screen may share physical elements. For example, some embodiments may utilize some of the same electrical components for displaying and sensing (e.g., an Active Matrix (e.g., a rectangular array) of Thin Film a-Si transistors for AMOLED and AMLCD, etc.). As another example, the display screen of the display 180 may be operated in part or in total by the processing system 110.

In various embodiments, the input device 100 may comprise one or more sensor electrodes configured for both display updating and input sensing. For example, at least one sensor electrodes that are used for input sensing may comprise one or more display electrodes of the display device that are used in updating the display. Further, the display electrode may comprise one or more of segments of a Vcom electrode (common electrodes), source drive lines (electrodes), gate line (electrodes), an anode sub-pixel electrode or cathode pixel electrode, or any other display element. These display electrodes may be disposed on an appropriate display screen substrate. For example, the display electrodes may be disposed on a transparent substrate (a glass substrate, TFT glass, or any other transparent material) in some display screens (e.g., In Plane Switching (IPS), Fringe Field Switching (FFS) or Plane to Line Switching (PLS) Organic Light Emitting Diode (OLED)), on the bottom of the color filter glass of some display screens (e.g., Patterned Vertical Alignment (PVA) Multi-domain Vertical Alignment (MVA), IPS and FFS), over an cathode layer (OLED), etc. In such embodiments, the display electrode can also be referred to as a "combination electrode", since it performs multiple functions. In various embodiments, each of the sensor electrodes comprises one or more display electrodes associated with a pixel or sub pixel. In other embodiments, at least two sensor electrodes may share at least one display electrode associated with a pixel or sub-pixel.

In various embodiments, a first sensor electrode comprises one or more display electrodes configured for display updating and capacitive sensing and a second sensor electrode may be configured for capacitive sensing and not for display updating. The second sensor electrode may be disposed between substrates of the display device or external from the display device. In some embodiments, all of the sensor electrodes may comprise one or more display electrodes configured for display updating and capacitive sensing.

Processing system 110 may be configured to perform input sensing and display updating during at least partially overlapping periods. For example, a processing system 110 may simultaneously drive a first display electrode for both display updating and input sensing. In another example, processing system 110 may simultaneously drive a first display electrode for display updating and a second display electrode for input sensing. In some embodiments, processing system 110 in configured to perform input sensing and display updating during non-overlapping periods. The non-overlapping periods may be referred to as non-display update periods. The non-display update periods may occur between display line update periods of common display frame and be at least as long as a display line update period. Further, the non-display update periods may occur between display line update periods of a common display frame and be one of longer than or shorter than a display line update period. In some embodiments, the non-display update periods may occur at the beginning of a display frame and/or between display frames. Processing system 110 may be configured to drive one or more of the sensor electrodes and/or the display electrodes with a shield signal. The shield signal may comprise one of a constant voltage signal or a varying voltage signal (guard signal). Further, one or more of the sensor electrodes and/or display electrodes may be electrically floated.

It should be understood that while many embodiments of the invention are described in the context of a fully functioning apparatus, the mechanisms of the present invention are capable of being distributed as a program product (e.g., software) in a variety of forms. For example, the mechanisms of the present invention may be implemented and distributed as a software program on information bearing media that are readable by electronic processors (e.g., non-transitory computer-readable and/or recordable/writable information bearing media readable by the processing system 110). Additionally, the embodiments of the present invention apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2A:
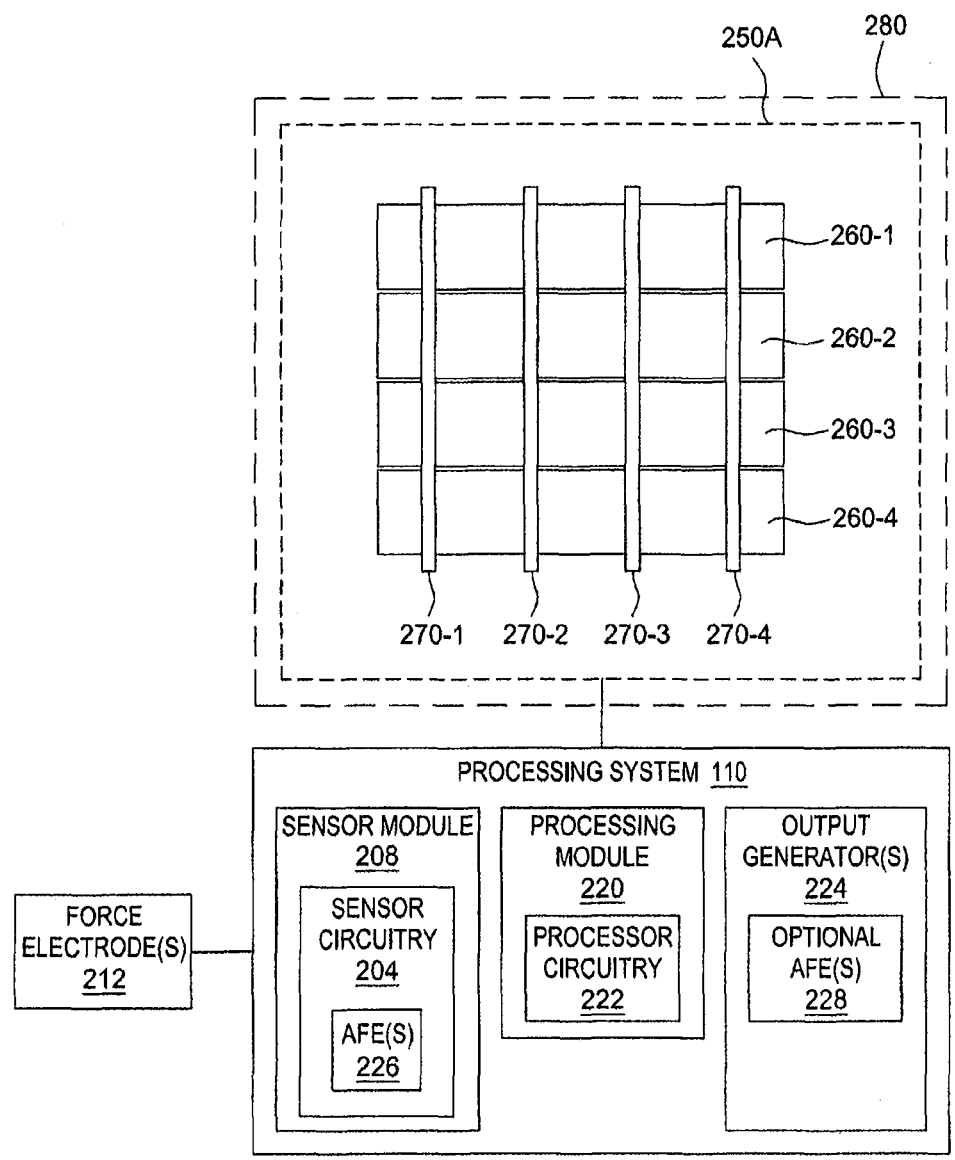
FIGS. 2A-2B illustrate portions of exemplary patterns of sensing elements according to aspects described herein.

FIG. 2A illustrates a portion of an exemplary pattern of sensing elements according to some embodiments. For clarity of illustration and description, FIG. 2A shows the sensing elements in a pattern of simple rectangular electrodes and does not show various components, such as various interconnects between the sensing elements and the processing system 110 or joining sensing elements (e.g. jumpers, vias, etc.). An electrode pattern 250A comprises a first plurality of sensor electrodes 260 (260-1, 260-2, 260-3, . . . 260-n), and a second plurality of sensor electrodes 270 (270-1, 270-2, 270-3, . . . 270-m) disposed over the first plurality of electrodes 260. In some designs the electrodes may be patterned to minimize overlap area and/or increase fringing capacitance. In the example shown, n=m=4, but in general n and m are each positive integers and not necessarily equal to each other. In various embodiments, the first plurality of sensor electrodes 260 are operated as a plurality of transmitter electrodes (referred to specifically as "transmitter electrodes 260"), and the second plurality of sensor electrodes 270 are operated as a plurality of receiver electrodes (referred to specifically as "receiver electrodes 270"). In another embodiment, one plurality of sensor electrodes may be configured to transmit and receive and the other plurality of sensor electrodes may also be configured to transmit and receive. In yet another embodiment, the processing system 110 receives resulting signals with one or more sensor electrodes of the first and/or second plurality of sensor electrodes while the one or more sensor electrodes are modulated with absolute capacitive sensing signals. The first plurality of sensor electrodes 260, the second plurality of sensor electrodes 270, or both can be disposed within the sensing region 120. The electrode pattern 250A can be coupled to the processing system 110.

The first plurality of electrodes 260 and the second plurality of electrodes 270 are typically ohmically isolated from each other. That is, one or more insulators separate the first plurality of electrodes 260 and the second plurality of electrodes 270 and prevent them from electrically shorting to each other. In some embodiments, the first plurality of electrodes 260 and the second plurality of electrodes 270 are separated by insulative material disposed between them at cross-over areas; in such constructions, the first plurality of electrodes 260 and/or the second plurality of electrodes 270 can be formed with jumpers connecting different portions of the same electrode. In some embodiments, the first plurality of electrodes 260 and the second plurality of electrodes 270 are separated by one or more layers of insulative material. In such embodiments, the first plurality of electrodes 260 and the second plurality of electrodes 270 can be disposed on separate layers of a common substrate. In some other embodiments, the first plurality of electrodes 260 and the second plurality of electrodes 270 are separated by one or more substrates; for example, the first plurality of electrodes 260 and the second plurality of electrodes 270 can be disposed on opposite sides of the same substrate, or on different substrates that are laminated together. In some embodiments, the first plurality of electrodes 260 and the second plurality of electrodes 270 can be disposed on the same side of a single substrate.

The areas of localized capacitive coupling between the first plurality of sensor electrodes 260 and the second plurality sensor electrodes 270 may form an array of "capacitive pixels" of a "capacitive image." The capacitive coupling between sensor electrodes of the first and second pluralities 260 and 270 changes with the proximity and motion of input objects in the sensing region 120. Further, in various embodiments, the localized capacitive coupling between each of the first plurality of sensor electrodes 260 and the second plurality of sensor electrodes 270 and an input object may be termed "capacitive pixels" of a "capacitive image." In some embodiments, the localized capacitive coupling between each one of the first plurality of sensor electrodes 260 and the second plurality of sensor electrodes 270 and an input object may be termed "capacitive measurements" of a "capacitive profile."

The processing system 110 can include a sensor module 208 having sensor circuitry 204. The sensor circuitry 204 operates the electrode pattern 250A to receive resulting signals from electrodes in the electrode pattern using a capacitive sensing signal having a sensing frequency. For example, the sensor circuitry 204 can include analog front end(s) (AFEs) 226 that receive the resulting signals from the sensor electrodes. The processing system 110 can include a processing module 220 configured to determine capacitive measurements from the resulting signals. The processing module 220 can include processor circuitry 222, such as a digital signal processor (DSP), microprocessor, or the like. The processing module 220 can include software and/or firmware configured for execution by the processor circuitry 222 to implement the functions described herein. Alternatively, some or all of the functions of the processor module 220 can be implemented entirely in hardware (e.g., using integrated circuitry). The processing module 220 can track changes in capacitive measurements to detect input object(s) in the sensing region 120. The processing system 110 can include other modular configurations, and the functions performed by the sensor module 208 and the processing module 220 can, in general, be performed by one or more modules or circuits in the processing system 110. The processing system 110 can include other modules and circuits, and can perform other functions as described in some embodiments below. The processing system 110 can include output generator(s) 224 that couple modulated signals to the sensing electrodes 260 and/or to the force electrode(s) 212. The output generator(s) 224 can include optional AFE(s) 228 that receives the resulting signals from the force electrode(s) 212.

The processing system 110 can operate in absolute capacitive sensing mode or transcapacitive sensing mode. In absolute capacitive sensing mode, receiver(s) in the sensor circuitry 204 measure voltage, current, or charge on sensor electrode(s) in the electrode pattern 250A while the sensor electrode(s) are modulated with absolute capacitive sensing signals to generate the resulting signals. The processing module 220 generates absolute capacitive measurements from the resulting signals. The processing module 220 can track changes in absolute capacitive measurements to detect input object(s) in the sensing region 120.

In transcapacitive sensing mode, transmitter(s) in the sensor circuitry 204 drive one or more of the first plurality of electrodes 260 with the capacitive sensing signal (also referred to as a transmitter signal or modulated signal in the transcapacitive sensing mode). Receiver(s) in the sensor circuitry 204 measure voltage, current, or charge on one or more of the second plurality of electrodes 270 to generate the resulting signals. The resulting signals comprise the effects of the capacitive sensing signal and input object(s) in the sensing region 120. The processing module 220 generates transcapacitive measurements from the resulting signals. The processing module 220 can track changes in transcapacitive measurements to detect input object(s) in the sensing region 120.

In some embodiments, the processing system 110 "scans" the electrode pattern 250A to determine capacitive measurements. In the transcapacitive sensing mode, the processing system 110 can drive the first plurality of electrodes 260 to transmit transmitter signal(s). The processing system 110 can operate the first plurality of electrodes 260 such that one transmitter electrode transmits at one time, or multiple transmitter electrodes transmit at the same time. Where multiple transmitter electrodes transmit simultaneously, these multiple transmitter electrodes may transmit the same transmitter signal and effectively produce a larger transmitter electrode, or these multiple transmitter electrodes may transmit different transmitter signals. For example, multiple transmitter electrodes may transmit different transmitter signals according to one or more coding schemes that enable their combined effects on the resulting signals of the second plurality of electrodes 270 to be independently determined. In the absolute capacitive sensing mode, the processing system 110 can receive resulting signals from one sensor electrode 260, 270 at a time, or from a plurality of sensor electrodes 260, 270 at a time. In either mode, the processing system 110 can operate the second plurality of electrodes 270 singly or collectively to acquire resulting signals. In absolute capacitive sensing mode, the processing system 110 can concurrently drive all electrodes along one or more axes. In some examples, the processing system 110 can drive electrodes along one axis (e.g., along the first plurality of sensor electrodes 260) while electrodes along another axis are driven with a shield signal, guard signal, or the like. In some examples, some electrodes along one axis and some electrodes along the other axis can be driven concurrently.

In the transcapacitive sensing mode, the processing system 110 can use the resulting signals to determine capacitive measurements at the capacitive pixels. A set of measurements from the capacitive pixels form a "capacitive image" (also "capacitive frame") representative of the capacitive measurements at the pixels. The processing system 110 can acquire multiple capacitive images over multiple time periods, and can determine differences between capacitive images to derive information about input in the sensing region 120. For example, the processing system 110 can use successive capacitive images acquired over successive periods of time to track the motion(s) of one or more input objects entering, exiting, and within the sensing region 120 or to determine no user inputs are present to enter a low power mode.

In absolute capacitive sensing mode, the processing system 110 can use the resulting signals to determine capacitive measurements along an axis of the sensor electrodes 260 and/or an axis of the sensor electrodes 270. A set of such measurements forms a "capacitive profile" representative of the capacitive measurements along the axis. The processing system 110 can acquire multiple capacitive profiles along one or both of the axes over multiple time periods and can determine differences between capacitive profiles to derive information about input in the sensing region 120. For example, the processing system 110 can use successive capacitive profiles acquired over successive periods of time to track location or proximity of input objects within the sensing region 120. In other embodiments, each sensor can be a capacitive pixel of a capacitive image and the absolute capacitive sensing mode can be used to generate capacitive image(s) in addition to or in place of capacitive profiles.

The baseline capacitance of the input device 100 is the capacitive image or capacitive profile associated with no input object in the sensing region 120. The baseline capacitance changes with the environment and operating conditions, and the processing system 110 can estimate the baseline capacitance in various ways. For example, in some embodiments, the processing system 110 takes "baseline images" or "baseline profiles" when no input object is determined to be in the sensing region 120, and uses those baseline images or baseline profiles as estimates of baseline capacitances. The processing module 220 can account for the baseline capacitance in the capacitive measurements and thus the capacitive measurements can be referred to as "delta capacitive measurements". Thus, the term "capacitive measurements" as used herein encompasses delta-measurements with respect to a determined baseline.

In some touch screen embodiments, at least one of the first plurality of sensor electrodes 260 and the second plurality of sensor electrodes 270 comprise one or more display electrodes of a display device 280 used in updating a display of a display screen, such as one or more segments of a "Vcom" electrode (common electrodes), gate electrodes, source electrodes, anode electrode and/or cathode electrode. These display electrodes may be disposed on an appropriate display screen substrate. For example, the display electrodes may be disposed on a transparent substrate (a glass substrate, TFT glass, or any other transparent material) in some display screens (e.g., In Plane Switching (IPS) or Plane to Line Switching (PLS) Organic Light Emitting Diode (OLED)), on the bottom of the color filter glass of some display screens (e.g., Patterned Vertical Alignment (PVA) or Multi-domain Vertical Alignment (MVA)), over an emissive layer (backlight), etc. The display electrodes can also be referred to as "combination electrodes," since the display electrodes perform functions of display updating and capacitive sensing. In various embodiments, each sensor electrode of the first and second plurality of sensor electrodes 260 and 270 comprises one or more combination electrodes. In other embodiments, at least two sensor electrodes of the first plurality of sensor electrodes 260 or at least two sensor electrodes of the second plurality of sensor electrodes 270 may share at least one combination electrode. Furthermore, in one embodiment, both the first plurality of sensor electrodes 260 and the second plurality electrodes 270 are disposed within a display stack on the display screen substrate. Additionally, at least one of the sensor electrodes 260, 270 in the display stack may comprise a combination electrode. However, in other embodiments, only the first plurality of sensor electrodes 260 or the second plurality of sensor electrodes 270 (but not both) are disposed within the display stack, while other sensor electrodes are outside of the display stack (e.g., disposed on an opposite side of a color filter glass away from the active matrix transistors).

In an embodiment, the processing system 110 comprises a single integrated controller, such as an application specific integrated circuit (ASIC), having the sensor module 208, the processing module 220, and any other module(s) and/or circuit(s). In another embodiment, the processing system 110 can include a plurality of integrated circuits, where the sensor module 208, the processing module 220, and any other module(s) and/or circuit(s) can be divided among the integrated circuits. For example, the sensor module 208 can be on one integrated circuit, and the processing module 220 and any other module(s) and/circuit(s) can be one or more other integrated circuits. In some embodiments, a first portion of the sensor module 208 can be on one integrated circuit and a second portion of the sensor module 208 can be on second integrated circuit. In such embodiments, at least one of the first and second integrated circuits comprises at least portions of other modules such as a display driver module and/or a display driver module.

Figure 2B:
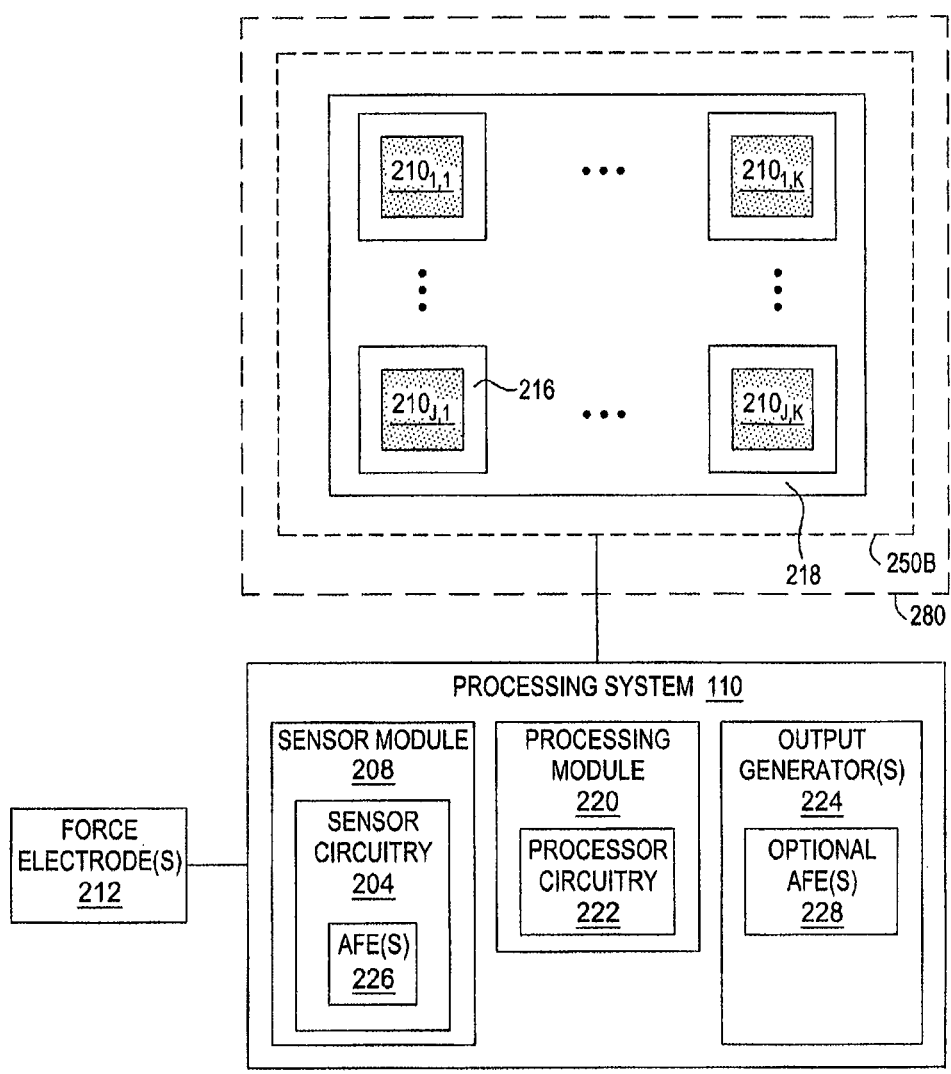

FIG. 2B illustrates a portion of another exemplary pattern of sensing elements according to some embodiments. For clarity of illustration and description, FIG. 2B presents the sensing elements in a matrix of rectangles and does not show various components, such as various interconnects between the processing system 110 and the sensing elements. An electrode pattern 250B comprises a plurality of sensor electrodes 210 disposed in a rectangular matrix (e.g., a rectangular array). The electrode pattern 250B comprises sensor electrodes $210_{J,K}$ (referred to collectively as sensor electrodes 210) arranged in J rows and K columns, where J and K are positive integers, although one of J and K may be enumerated as zero. It is contemplated that the electrode pattern 250B may comprise other patterns of the sensor electrodes 210, such as polar arrays, repeating patterns, non-repeating patterns, non-uniform arrays a single row or column, or other suitable arrangement. Further, the sensor electrodes 210 may be any shape, such as circular, rectangular, diamond, star, square, nonconvex, convex, nonconcave concave, etc. Further, the sensor electrodes 210 may be sub-divided into a plurality of distinct sub-electrodes. The electrode pattern 250 is coupled to the processing system 110.

The sensor electrodes 210 are typically ohmically isolated from one another. Additionally, where a sensor electrode 210 includes multiple sub-electrodes, the sub-electrodes may be ohmically isolated from each other. Furthermore, in one embodiment, the sensor electrodes 210 may be ohmically isolated from a grid electrode 218 that is between the sensor electrodes 210. In one example, the grid electrode 218 may surround one or more of the sensor electrodes 210, which are disposed in windows 216 of the grid electrode 218. In some embodiments, the electrode pattern 250B can include more than one grid electrode 218. In some embodiments, the grid electrode 218 can have one or more segments. The grid electrode 218 may be used as a shield or to carry a guarding signal for use when performing capacitive sensing with the sensor electrodes 210. Alternatively or additionally, the grid electrode 218 may be used as sensor electrode when performing capacitive sensing. Furthermore, the grid electrode 218 may be co-planar with the sensor electrodes 210, but this is not a requirement. For instance, the grid electrode 218 may be located on a different substrate or on a different side of the same substrate as the sensor electrodes 210. The grid electrode 218 is optional and in some embodiments, the grid electrode 218 is not present.

In a first mode of operation, the processing system 110 can use at least one sensor electrode 210 to detect the presence of an input object via absolute capacitive sensing. The sensor circuitry 204 can measure voltage, charge, or current on sensor electrode(s) 210 to obtain resulting signals indicative of a capacitance between the sensor electrode(s) 210 and an input object. The processing module 220 uses the resulting signals to determine absolute capacitive measurements. With the electrode pattern 250B, the absolute capacitive measurements can be used to form capacitive images. To sense the full array of electrodes 210 sensor circuitry 204 may include multiplexors to scan through them and select which subset of electrodes to connect to AFEs 226 and which to connect to a guard signal.

In a second mode of operation, the processing system 110 can use groups of the sensor electrodes 210 to detect presence of an input object via transcapacitive sensing. The sensor circuitry 204 can drive at least one of the sensor electrodes 210 with a transmitter signal, and can receive a resulting signal from at least one other of the sensor electrodes 210. The processing module 220 uses the resulting signals to determine transcapacitive measurements and form capacitive images.

The input device 100 may be configured to operate in any one of the modes described above. The input device 100 may also be configured to switch between any two or more of the modes described above. The processing system 110 can be configured as described above with respect to FIG. 2A.

In some embodiments, the processing system 110 is further configured to determine force information for an input object. As shown in FIGS. 2A-2B, the processing system 110 can be further coupled to one or more force electrodes 212. The processing system 110 can determine the force information in response to capacitive measurements obtained using sensor electrodes of the input device 100, one or more force electrode(s) 212, or a combination of both. For example, transcapacitive measurements can be obtained between the sensor electrodes integrated within a display device of the input device 100 and/or a dedicated force receiver electrode. In another example embodiment, self-capacitive measurements can be obtained using the sensor electrodes and/or the force electrode 212. The sensor electrodes of the input device 100 can bend in response to a force applied by an input object. The bending results in a deflection from equilibrium of at least a portion of the sensor electrodes integrated within the display device. The deflection of sensor electrode(s) due to the applied force changes the distance between at least one of the sensor electrodes and the one or more force receiver electrodes, which can be detected as a change in transcapacitance. The force information can include a "force image", "force profile", or a scalar force value, depending on the configuration of the sensor electrodes and the force electrodes 212. The force information can be combined with position information to determine both position of one or more input object(s) and report an estimated force applied by each input object.

Figure 3:
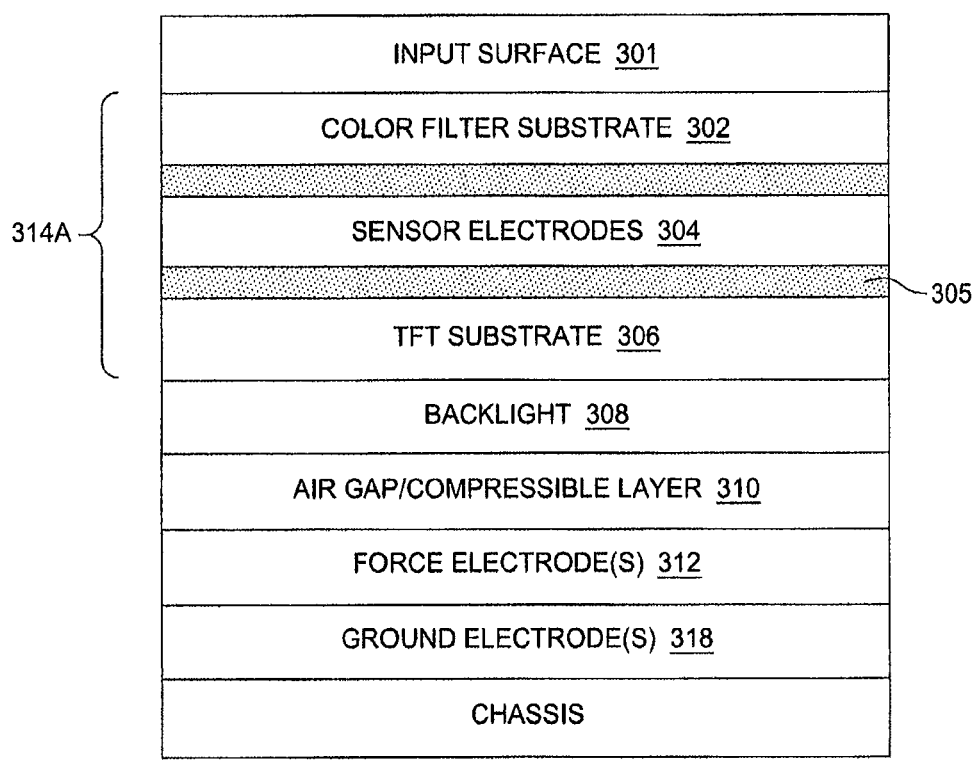
FIG. 3 is a block diagram depicting a cross-section of an input device according to an aspect.

FIG. 3 is a block diagram depicting a cross-section 300 of the input device 100 according to embodiments. The input device 100 includes an input surface 301, a display cell 314 (also generally referred to as the display 314), a backlight 308, an air gap/compressible layer 310, and at least one force electrode 312. The input surface 301 can include a transparent substrate, such as a glass substrate. The force electrode(s) 312 can be metal electrode(s). The force electrode(s) 312 may be one large conductive electrode or disposed as a plurality of conductive electrodes in any pattern. In some aspects, each of the conductive electrode(s) 312 can be a conductive, structural element of the input device 100 that is re-used for influencing capacitive measurements to obtain force information, as discussed further below. In aspects, the force electrode(s) 312 can be a metallic sheet. The force electrode(s) 312 may be referred to as internal electrodes, an internal chassis, and/or a display chassis (e.g., of the backlight unit or of a full mobile device).

In an aspect, the display cell 314 includes a color filter substrate 302 (e.g., a color filter glass), inner layers 305, and a thin-film transistor (TFT) substrate 306. The inner layers 305 can include various layers, such as a color filter layer, liquid crystal display (LCD) material layer, conductive layers, dielectric layers, and the like. In particular, the inner layers 305 include one or more conductive layers forming sensor electrodes 304. The color filter substrate 302, the inner layers 305, and the TFT substrate 306 are flexible such that the display cell 314 is flexible. The layer 304 may be above, below, or within the inner layers 305.

The sensor electrodes 304 can have various configurations. In one example, the sensor electrodes 304 can include the plurality of sensor electrodes 260 (or both the sensor electrodes 260 and the sensor electrodes 270) in the sensor electrode pattern 250A. In another example, the sensor electrodes 304 can include the sensor electrodes 210 in the sensor electrode pattern 250B. In any configuration, the sensor electrodes 304 can be disposed on the same layer or on different layers. In any configuration, at least a portion of the sensor electrodes 304 can be common electrodes configured for display updating and capacitive sensing. In any configuration, at least a portion of the sensor electrodes 304 also can be force electrodes 212 configured for capacitive force sensing in addition to capacitive touch sensing.

The display cell 314 is disposed between the input surface 301 and the backlight 308. The display cell 314 is flexible and can flex or bend when force is applied to the input surface 301. In the present example, the conductive electrode(s) 312 are separated from the backlight 308 by the air gap/compressible layer 310, which can either be an air gap or a layer of compressible material. In other aspects, the backlight 308 and the air gap/compressible layer 310 may be an integrated layer of insulated light-guide material. Accordingly, according to some aspects, the sensor electrodes 304 are disposed between the input surface 301 and the force electrode(s) 312. The sensor electrodes 304 are configured to deflect toward the force electrode(s) 312 as the display cell 314 bends into the air gap/compressible layer 310 in response to a force applied to the input surface 301. Depending on the location of the force applied to the input surface 301, at least a portion of the sensor electrodes 304 will deflect toward the force electrode(s) 312 in response to the applied force.

The force electrode(s) 312 can be operated to influence the capacitive measurements obtained from the sensor electrodes 304 in response to the applied force. Thus, the input device 100 can include force electrodes 212, which include at least a portion of the sensor electrodes 304 and at least a portion of the conductive electrode(s) 312. In further aspects, some of the force electrodes 212, such as sensor electrodes 304, are configured to deflect towards other force electrodes 212, such as the conductive electrode(s) 312, in response to an applied force. The deflected force electrodes 212 (e.g., sensor electrodes 304) are configured for absolute capacitive sensing to determine force information. The fixed force electrode(s) 212 (e.g., the force electrode(s) 312) can be operated as described below during the absolute capacitive sensing.

While FIG. 3 illustrates one potential aspect, it should be understood that various other configurations may operate under the principles described herein. For example, in some embodiments, receiver electrodes (e.g., sensor electrodes 270) can be disposed on the color filter substrate 302 between the input surface 301 and the color filter substrate 302. In some embodiments, the force electrode(s) 312 can be transparent or substantially transparent and the backlight 308 can be disposed beneath the conductive electrode(s) 312. In some embodiments, the force electrode(s) 312 are part of a chassis of the input device 100. Alternatively, the force electrodes 312 can be disposed between the display cell 314 and a chassis of the input device 100. In some embodiments discussed further below, a ground electrode 318 is disposed between the force electrode(s) 312 and a chassis of the input device 100. Other types of flexible display cells can be used, such as an OLED display. In general, the display cell can include display pixels formed from LEDs, OLEDs, plasma cells, electronic ink elements, LCD components, or other suitable display pixel structures compatible with flexible displays.

According to aspects described in more detail, the sensor electrodes (e.g., sensor electrodes 304) and force electrode(s) (e.g., force electrode(s) 3112) can be operated (e.g., driven with signals) in various manners to obtain different types of measurements. In some cases, the manner of operation may be based (e.g., dynamically) on an operating state of the input device. For example, in a low power state, the input device may be operated for baseline force and touch measurements. In the presence of an input object, the input device may be operated for touch and/or force measurements, and also may be operated for interference measurements (e.g., periodically). In the presence of interference, the input device may be operated to double the touch and/or force signal. In some cases, the input device may operate in a time out state and perform no measurements.

Techniques described herein may provide for the sensor and force electrodes to be driven with alternating signals, such between as ground, guard, and/or anti-guarding voltages in order to obtain touch only measurements, force only measurements, and/or summed or differenced touch and force measurements. According to aspects, by alternating the signals, the measurements can be compared (e.g., added or subtracted) to isolate (i.e., differentiate) the touch/force measurements and, in some cases, to obtain twice the signal for a particular measurement (e.g. force). According to further aspects, in-phase and quadrature demodulation of orthogonal waveforms can be used to obtain simultaneous and independent touch and force measurements.

Example Differential Touch and Force Sensing Using Anti-Guarding Signal

In the configuration of the input device 100 shown in FIG. 3, the capacitance measurements detected (e.g., sensed) by the processing system 110 can include influences from both sides of the display 314. Thus, both touch effects and bending effects of force can be detected; however, distinguishing between the touch effects and the force effects, and compensating for mounting variations of the display 314, may be difficult. For example, at start up time or test development time/calibration, there may be no finger on the device to provide touch effects. Therefore, the chassis may be measured relative to sensor electrodes 304 (e.g., in the display). However, at other times, there may be both touch effects and force effects. In some cases, anti-bending techniques, curvature methods, histogram methods, etc. can be used to distinguish between touch and force effects on the measured capacitance.

By differentially measuring back-coupled capacitance (i.e., the capacitance coupled to the sensor electrodes 304 due to proximity with the force electrode(s) 312), mounting variations, low grounded mass (LGM) through device coupling to the user input, interference, and fast moving finger effects can be corrected. The touch effects on the measured capacitance (referred to as the finger signal) may be separately affected by LGM or interference, while the force effects on the measured capacitance (referred to as the force signal) are most affected by the non-linear sensitivity of parallel plate capacitance to deflection.

According to certain aspects, while driving the touch sensing electrode(s) (e.g., sensor electrodes 304) with a capacitive sensing signal (e.g., referred to as a modulated reference voltage), a force electrode (e.g., a force electrode 312) can be driven alternately with a ground signal/guard signal and an anti-guard signal in order to perform differential touch and force sensing. As used herein, a "constant signal" is a signal that is unmodulated with respect to a reference voltage, such as system ground. A "ground signal" is a constant signal having an AC grounded voltage (e.g., the reference voltage or a voltage offset from the reference voltage, the system ground, etc). A "modulated signal" or "modulating signal" is a signal that is modulated with respect to the reference voltage (e.g., changes with respect to a "ground signal" over time). As described above, the capacitive sensing signal can be a modulated signal or a constant signal. In an embodiment, a "guard signal" is a signal that is aligned (or substantially aligned) with the capacitive sensing signal in terms of amplitude and/or phase. For example, the guard signal can be a modulated signal that has the same phase and the same or different amplitude (e.g., fractional guarding or over guarding) as a modulated capacitive sensing signal. In another example, the guard signal can be a constant signal that has the same modulation amplitude as a constant capacitive sensing signal (e.g. full guarding). In an embodiment, an "anti-guard signal" is a signal that is not aligned with respect to the capacitive sensing signal (e.g., inverted phase or opposite polarity). For example, the anti-guard signal can be a modulated signal that is anti-phase (e.g., 180 degrees out of phase) with a modulated capacitive sensing signal. The amplitude of the modulated anti-guard signal can be the same, more than, or a fraction (not zero) of the amplitude of the modulated capacitive sensing signal. In another example, the anti-guard signal can be a constant signal that has an inverse voltage of a constant capacitive sensing signal. The term "anti-phase" includes phase alignment between signals that is substantially 180 degrees.

According to certain aspects, by driving the force electrode (e.g., force electrode 312) for force sensing, rather than the device chassis, then the chassis may be coupled to system ground, and the force electrode may be modulated relative to the chassis and the display. In this case, it is possible to measure force, finger, or force and finger. For example, by not modulating the sensor electrodes 304 relative to the ground and modulating the force electrode relative to the ground, the force signal alone can be measured. Alternatively, by modulating the sensor electrodes 304 relative to the ground and not modulating the force electrode 312 relative to the ground, the touch signal alone can be measured. Alternatively, by modulating both the sensor electrodes 304 and the force electrode 312 relative to the ground, for example, by fully guarding the sensor electrode modulated reference voltage, the touch signal alone can be measured. Alternatively, by modulating the sensor electrodes 304 and the force electrode 312 in opposite directions (e.g., modulated reference and anti-guard), the force signal can be doubled and summed with a touch signal can be obtained.

Figure 4:
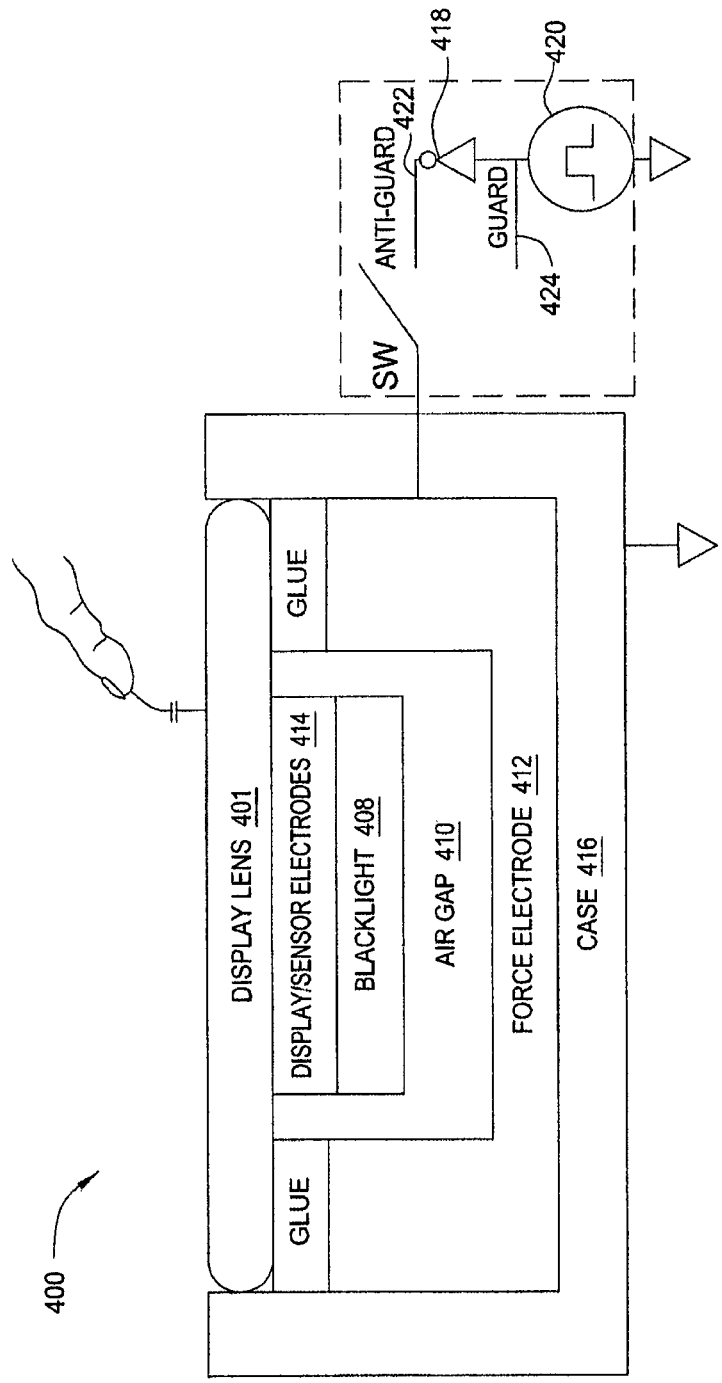
FIG. 4 is a block diagram depicting a simplified cross-section of an example input device with an alternating guard and anti-guard signal applied to the internal conductive housing of the input device, according to an aspect.

In one example implementation, illustrated in FIG. 4, the input device 400 may include display lens 401, display/sensor electrodes 414, backlight 408, air gap 410, force electrode 412, and case 416, and an output generator which includes an inverter 418 and a signal generator 420. The display lens 401 may correspond to the input surface 301 illustrated in FIG. 3. The display/sensor electrodes 414 may correspond to the display 314A including sensor electrodes 304, the backlight 408 may correspond to the backlight 308, the force electrode may correspond to the force electrode(s) 312 and the case 416 may correspond to the ground electrode(s) 318 and chassis. The case 416 may be an external chassis of the input device 400 and may be coupled to the system ground.

As shown in FIG. 4, the force electrode 412 may be an internal electrode or an internal display chassis of the input device 400. As shown in FIG. 4, the output generator can drive the force electrode 412 with an alternating guard and anti-guard signal. For example, the signal generator 420 can generate a signal, such as the guard signal 424 (of the same phase and amplitude as the modulated reference on 414), which the inverter 418 can switch to the anti-guard signal 422 (e.g., using similar rails and inverting the signal output between two available guard voltage rails). The force electrode 412 may be driven by the guard signal 424 and/or the anti-guard signal 422 while the sensor electrodes 424 are being driven with a modulated reference sensing signal (e.g., Vmod) or with a constant reference signal (e.g., ground). For example, a switch (SW) may be controlled by the processing system 110 or an external testing module to alternate between the guard and anti-guard signals. Changes in capacitance of the sensor electrodes 414 can be measured while the force electrode is being driven by the guard and anti-guard signal.

In some cases, the switch (SW) can be moved between the two stages (guard and anti-guard) depending on what is to be measured. For example, while the force electrode 412 is driven with the guard signal 424, the resulting signal may correspond to a touch-only measurement. When driving the force electrode with the ground signal, the signal may be Vmod. According to certain aspects, a guard signal may be similar to the voltage modulated on the sensing (e.g. segmented Vcom) electrodes. For example, the guard signal may be equal in phase and/or amplitude to the modulated sensing signal on the sensing electrodes.

If a guard signal is applied to the device chassis (e.g., the metal frame) of the input device, the guard signal may minimize the effect of the housing. For example, the guard signal may be generated by the same complementary output generator (COG) used by the sensor circuitry 204 to measure the touch signal, or it can be generated by another application specific integrated circuit (ASIC) separate from the sensor circuitry 204.

On the other hand, while the force electrode 412 is driven with the anti-guarding signal 422, the resulting signal may correspond to a touch and force measurement. According to aspects, by alternating the driving signals, the resulting signals can be combined/compared (e.g., by addition or subtraction) to obtain other measurements, such as double the force measurement. By driving the force electrode with the anti-guard signal, the resulting force signal may be equal to 2 Vmod. As described above, using the anti-guard signal for driving the force electrode may approximately double the sensitivity of the sensor circuitry 204 to force deflections (e.g., doubles the force signal). Using the anti-guard signal may reduce scale factor errors in estimating housing (e.g., air-gap or foam) capacitance used for calibration. Dynamic correction of air-gap distance, for example, while the input device is held in the hand may be easier because both ground and anti-guard do not risk guard-user coupling (e.g., through contact or LGM) and reducing the finger coupled signal below touch thresholds.

According to certain aspects, scaling of the anti-guard signal can be fractional integers, multiple integers, or any rational number. Either positive or negative polarity can be used. Ground is the case of zero scaling and full guard is the case of 1 scaling. While −1 scaling is primarily described herein, the scaling could also be −½, ⅓, 2, −3, etc., limited by the voltage modulation range and accuracy of the anti-guard drive electronics. According to certain aspects, an internal or external inverting or non-inverting amplifier may be used to generate the anti-guard signal.

Figure 5:
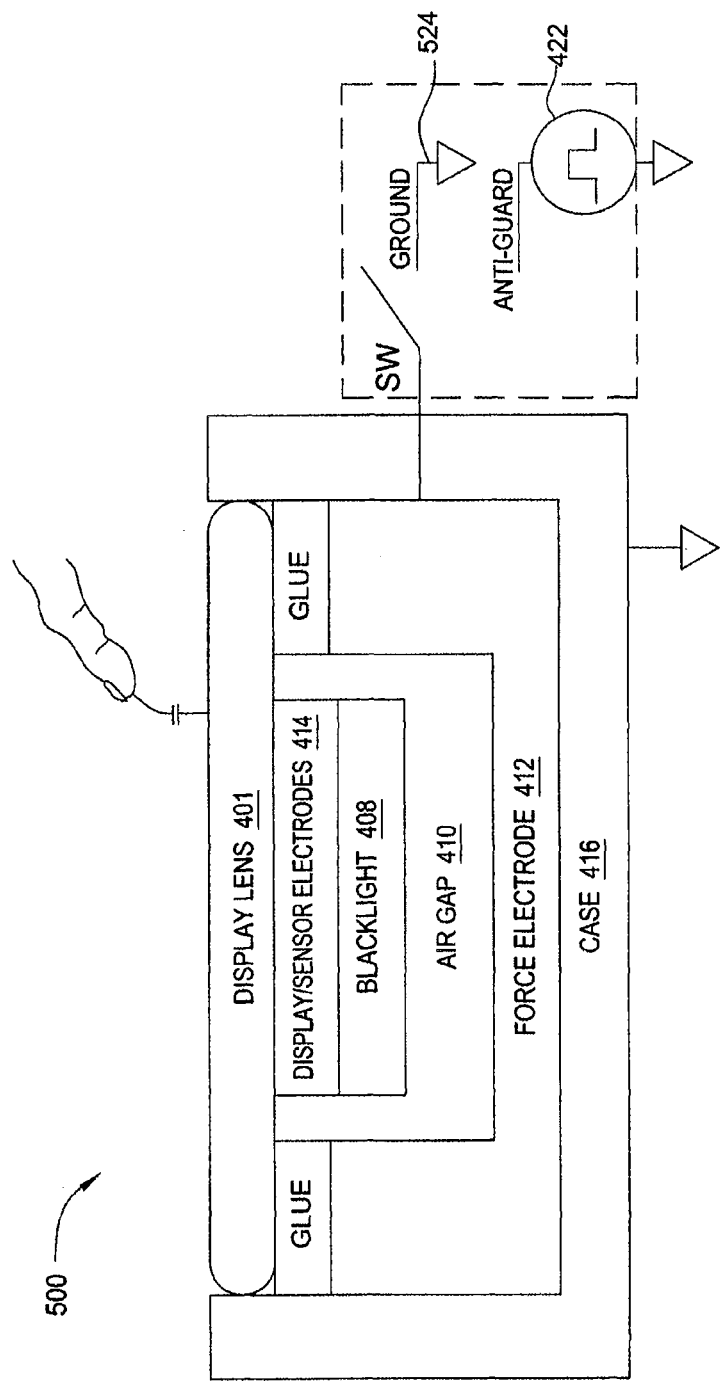
FIG. 5 is a block diagram depicting a simplified cross-section of an example input device with an alternating ground and anti-guard signal applied to the internal metal housing of the input device, according to an aspect.

In another example implementation shown in FIG. 5, the force electrode 412 may be driven by a signal that alternates (e.g., switches) between ground (e.g., a constant voltage) and anti-guard (e.g., 180 degrees out of phase with respect to the modulating voltage driving the sensor electrodes) signals. In this case, for example, while the force electrode 412 is driven with the ground/constant voltage signal 524, interference measurements can obtained.

In some cases, the input object (e.g., a finger) is moving and also applying force. It may be desirable to measure the effects of finger and force closely in time to minimize motion artifacts. According to certain aspects, this can be done by rapidly alternating between taking measurements while driving the force electrode (e.g., force electrode 312 or 412) with the guard and anti-guard signal (in either order). A multiplexer (mux) takes a multiple-input signal and provides a single output. According to certain aspects, while using the same multiplexer (mux) settings to select measured touch electrodes, the processing system 110 can alternate between the guarded and anti-guard signal measurements. According to certain aspects, instead of performing the finger measurements for an entire frame (e.g., 8 ms), the finger and force measurements can be taken multiple times (e.g. at different mux locations) in the scan of the touch frame (e.g., alternating every millisecond). Alternatively, measurements (e.g. capacitive images) of preceding and following adjacent touch measurement frames can be combined to form the differential measurements to effectively calibrate the force deflection.

According to certain aspects, measurements of different parts of the array pattern 250 can be performed in rapid succession (e.g., in one display update frame) to compose one or more capacitive images. For example, the processing system 110 can alternate between touch and force measurements. In one example, both force and touch can be measured over a portion of the array 250 at approximately a 1 ms time rate. Thus, multiple force and touch measurements may be taken faster than finger movement. Because the measurements are taken in rapid succession, it may be assumed that the finger has not changed position or force in that time and the two are well correlated. By adding together sequential touch plus force and touch minus force measurements, a twice the touch signal can be obtained, assuming force does not change. By subtracting the touch plus force and touch minus force measurements, twice the force signal can be obtained, assuming touch does not change. Increasing the signal may lead to improved signal to noise ratio (SNR) and filtering the effect of interference. According to certain aspects, the processing system 110 can alternate between touch plus force and touch minus force measurements. The results can be combined differentially to remove chassis capacitive effects from the system.

Figure 6:
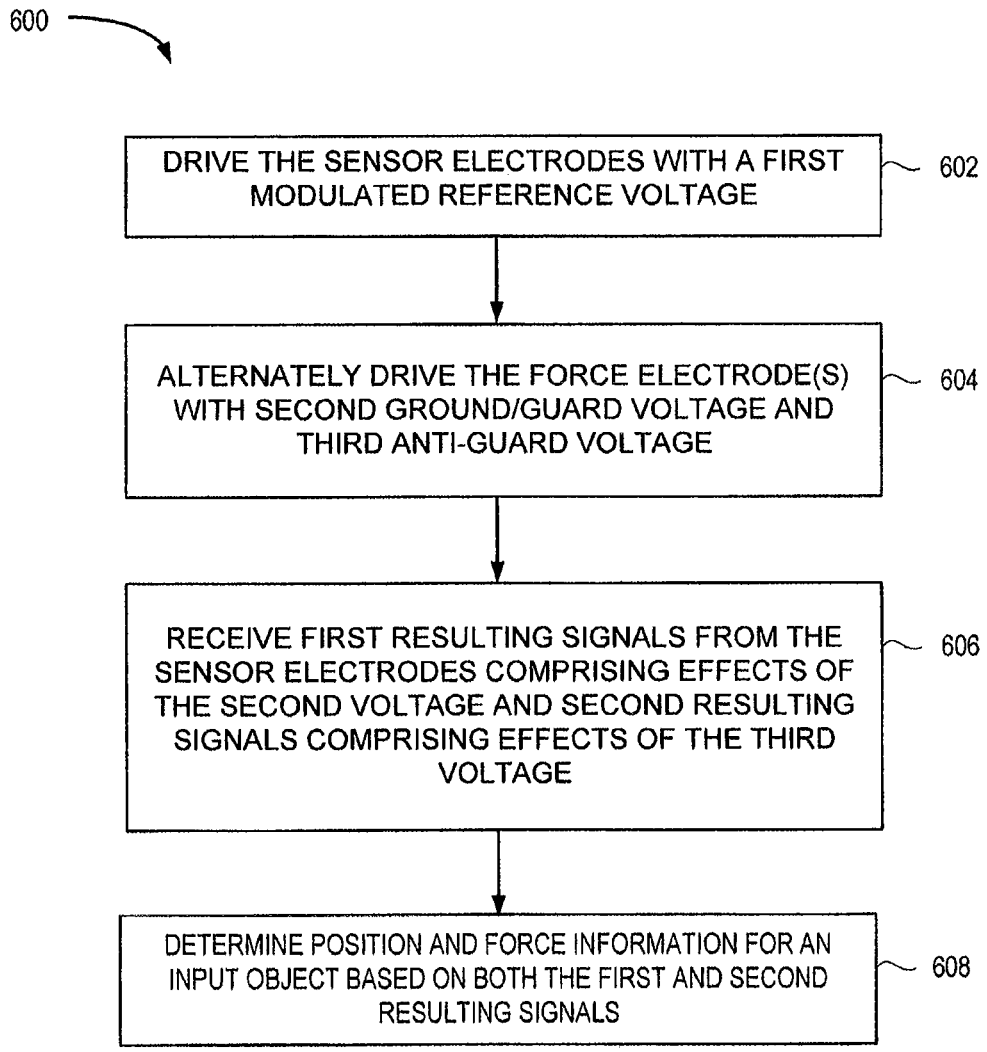
FIG. 6 is a flow diagram illustrating example operations for differential touch and force sensing using an anti-guarding signal, according to an aspect.

FIG. 6 is a flow diagram illustrating example operations 600 for differential touch and force sensing using an anti-guarding signal, according to an aspect. The operations 600 can be performed by the processing system 110 described above to determine position information, force information, or both force information and position information for an input object interacting with the input device 100. In an aspect, processing system 110 performs all or a portion of the operations 1100 during a non-display update time, such as a vertical blanking time or a horizontal blanking time.

The operations 600 begin at step 602, where the processing system 110 drives the sensor electrodes with a first modulated reference voltage (e.g., modulated with respect to the system ground). For example, the processing system 110 drives a plurality of sensor electrodes with a first sensing signal, the plurality of sensor electrodes disposed between an input surface of the input device and at least one force electrode of the input device, the plurality of sensor electrodes configured to deflect toward the at least one force electrode in response to a force applied to the input surface. According to certain aspects, the first sensing signal may be a modulating signal (e.g., Vmod) having a varying voltage. Alternatively, the first sensing signal may be an AC ground having a constant voltage. The receiving sensors may be modulated relative to the system ground (e.g., absolute capacitance measurement), or may be unmodulated (e.g. trans-capacitive measurement) relative to system ground while the transmitters are modulated.

At step 604, the processing system 110 alternately drives the force electrode(s) with second and third sensing signals (e.g. alternating between ground/guard and anti-guard signals). For example, while driving the plurality of sensor electrodes with the first sensing signal, the processing system 110 drives the at least one force electrode by alternating between a second sensing signal (e.g. guarding voltage modulation) and a third sensing signal (e.g. an anti-guarding voltage modulation). In some aspects, the processing system 110 drives the at least one force electrode with a constant voltage signal (e.g., ground) to acquire interference measurements and/or trans-capacitive measurements. The processing system 110 may alternate the force electrode quickly between the second sensing signal and the third sensing signal (e.g., multiple times in a single touch or display update frame).

At step 606, the processing system 110 receives resulting signals from the sensor electrodes for both second and third force electrode signals. For example, the processing system 110 receives resulting signals comprising effects of at least two of the modulated reference voltage, the guarding voltage, or the anti-guarding voltage.

At step 608, the processing system 110 determines at least position and force information for an input object based on the resulting signals.

Example Simultaneous Touch and Force Sensing Using in-Phase Quadrature Demodulation Typically, the touch signal (e.g., the finger signal) is detected by measuring the background capacitance and filtering it to estimate a baseline, and subtracting the baseline capacitance from all subsequent measurements to get the "future" finger signals. According to the techniques provided herein, the background capacitance may be measured simultaneously and independently with the finger signal.

Figure 7:
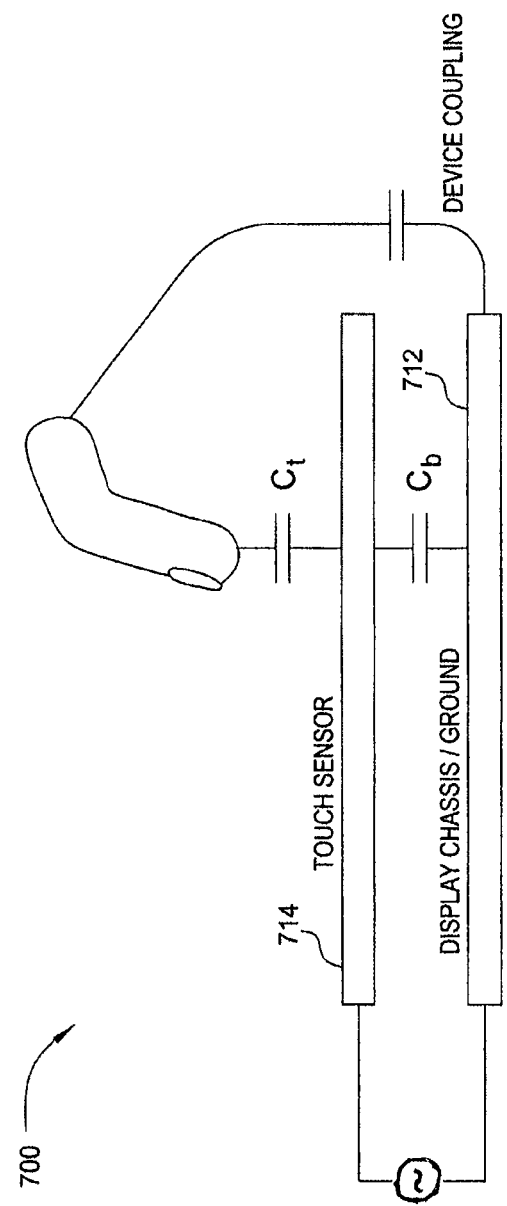
FIG. 7 is a block diagram depicting a simplified cross-section of an example input device showing driving the electrodes with a modulated sensing signal to acquire touch-to-sensor capacitive coupling and background capacitance, according to an aspect.

FIG. 7 is a block diagram depicting a simplified cross-section of an input device 700 showing driving the sensor and force electrodes with a modulated sensing signal to acquire touch-to-sensor capacitive coupling and background capacitance, according to an aspect. As shown in FIG. 7, the baseline or background capacitance, $C_b$, carries deflection information (e.g., due to force of touch) between the touch sensor electrodes 714 and the display chassis/ground 712. $C_b$ is an additive quantity to the touch-to-sensor coupling capacitance, $C_t$. The resulting signal may be given by:

$$S(t)=(C_t+C_b)V_m$$

According to certain aspects, in-phase and quadrature demodulation can be used to obtain simultaneous and independent force and touch measurements. The sensor electrodes (e.g., sensor electrodes 304 or 414) and the force electrode(s) (e.g., force electrode 312 or 412) can be driven with orthogonal (e.g., approximately 90 degree out-of-phase) signals. The signals can be orthogonal in frequency (e.g., where each of the orthogonal frequencies are outside the other's filter bandwidth), phase (e.g., one is Sine and the other in Cosine at the same frequency), or coded sequence (e.g. linear feedback shift register (LFSR), Barker code, Hadamard codes, etc.). In such case, both signals can be demodulated simultaneously.

Figure 8:
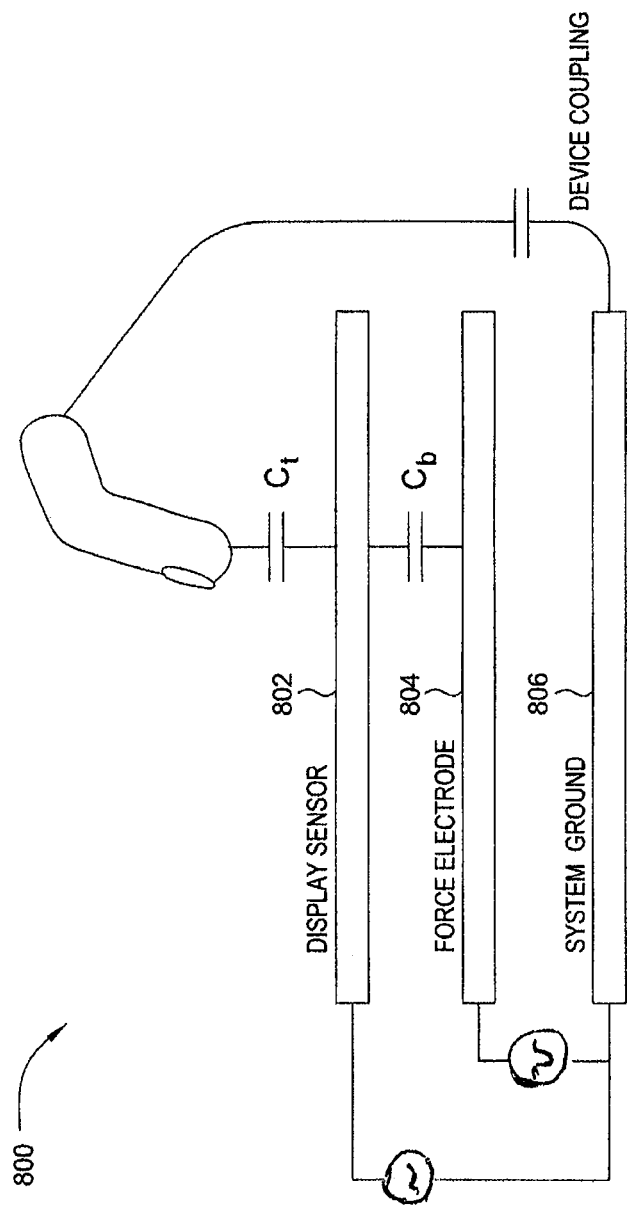
FIG. 8 is a block diagram depicting a simplified cross-section of an example input device showing driving the electrodes with orthogonal modulated sensing signals to acquire touch-to-sensor capacitive coupling and background capacitance, according to an aspect.

According to certain aspects, in addition to the touch/display sensor electrode 802 and force electrode 804, the input device may include a device ground 806, such as ground electrode 318 (e.g., a conductive plate or metallic sheet) between the device chassis and the force electrode, as shown in FIG. 8.

According to certain aspects, the resulting signal can be measured by the sensor circuitry 204 (e.g., in some embodiments by AFE(s) 226), connected to the sensor electrodes. As shown in FIG. 8, $C_t$ is the finger-to-electrode coupling that provides the touch signal, and $C_b$ is the background capacitance that provides the force information (e.g., whether the sensor electrodes 414 and the force electrode 422 have been deformed with respect to each other, for example by the force of touch by a user). $V_m$ is the modulated signal, relative to the system ground 806, used to drive the display sensor 802 and $V_{mm}$ is the modulated signal, relative to the system ground, used to drive the force electrode 804, where a component of $V_m$ and $V_{mm}$ are orthogonal in frequency, phase, or coded sequence.

Figure 9A:
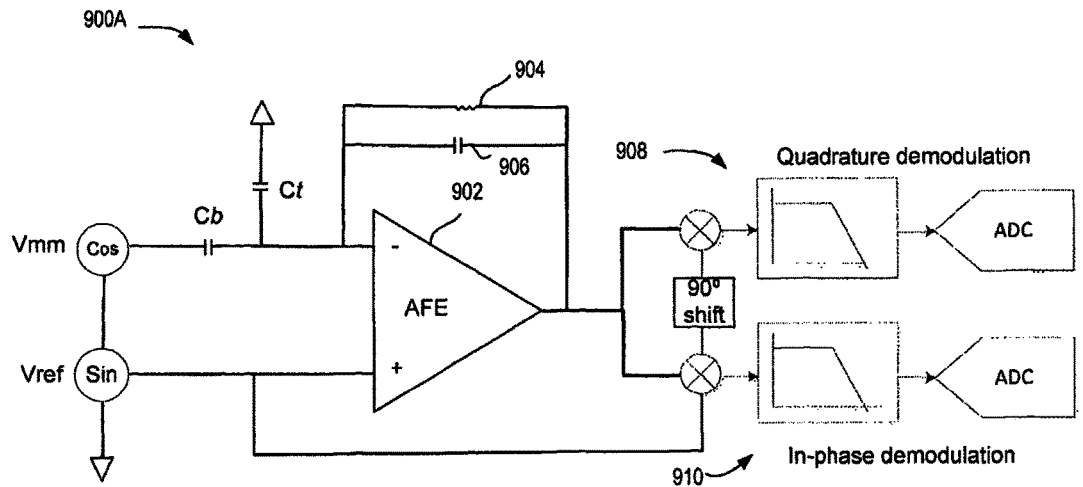
FIG. 9A-9B are block diagrams illustrating example signal paths for both in-phase and/or quadrature demodulation of resulting signals, and guarding/anti-guarding sensing according to aspects described herein.

As shown in FIG. 9A, two demodulators 908 and 910 can be used per sensor electrode, for example, to measure both in-phase and quadrature (e.g., I/Q demodulation) simultaneously. The signal Vm (Vref) (e.g., SIN) may be driven onto the sensing electrode by the AFE 902, while a force electrode is modulated by signal Vmm (e.g., COS) and their summed charge accumulated on an RC feedback network (including capacitor 906 and resistor 904). By demodulating both phase (e.g. I/Q) signals and filtering them, two independent localized measurements of Ct and Cb can be made simultaneously and reported by the ADCs. The total charge (e.g., the signal) S(t) received from the tixel (e.g., capacitive image pixel) upon touch can be given by:

$$S(t) = (C_t + C_b)V_m - C_b V_{mm},$$

where $$V_m = A\sin\left(2\pi\frac{t}{T}\right)$$

$$V_{mm} = V_m + A\sin\left(2\pi\frac{t-\varphi}{T}\right)$$

where T is the period of the oscillations, A is the amplitude, and φ is the delay. Substituting $V_m$ and $V_{mm}$ into the equation for the signal gives:

$$S(t) = C_t A\sin\left(2\pi\frac{t}{T}\right) - C_b A\sin\left(2\pi\frac{t-\varphi}{T}\right)$$

Demodulating the signal by in-phase and quadrature gives an in-phase component:

$$I = \frac{2}{T}\int_0^T S(t)\sin\left(2\pi\frac{t}{T}\right)dt = C_t - C_b\cos\left(2\pi\frac{\varphi}{T}\right)$$

and a quadrature component:

$$Q = \frac{2}{T}\int_0^T S(t)\cos\left(2\pi\frac{t}{T}\right)dt = C_b\sin\left(2\pi\frac{\varphi}{T}\right)$$

where φ=T/4:
I=$C_t$
Q=$C_b$

Thus, the quantities $C_t$ and $C_b$ come out independent of each other and can be measured simultaneously.

According to certain aspects, the demodulator can be in the modulating circuit itself (e.g., the output generator(s) 224). Another AFE can be added in the modulating circuit to perform simultaneous I/Q demodulation on the ground electrode 318. In this case, another total force of deflection/deformation can be determined as a whole, rather than as a function of position per sensor electrode.

Figure 9B:
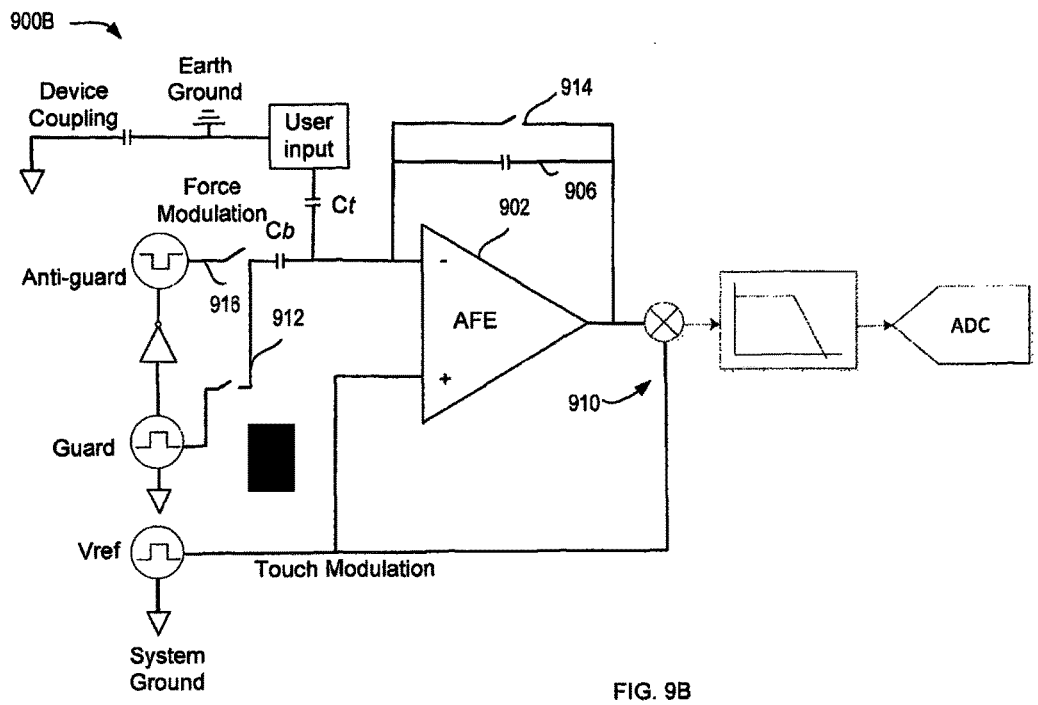

As shown in FIG. 9B, guard and anti-guard signals may be alternately driven relative to system ground onto the force electrode using switches (e.g., switch 912 and switch 916) to modulate background capacitance Cb. The modulation (e.g., Vmod or Vref) of the sensing electrode allows measurement of Ct from a user input. AFE 902 may sum the two charges by accumulating charge onto a feedback capacitor 906, which may be intermittently (e.g. every measurement, every cycle, or half-cycle) reset with a reset switch 914. The output of the AFE 902 may be demodulated with respect to the modulation of the sensing electrode and guard/anti-guard signals and filtered to provide homodyne measurements and ADC results.

Figure 10:
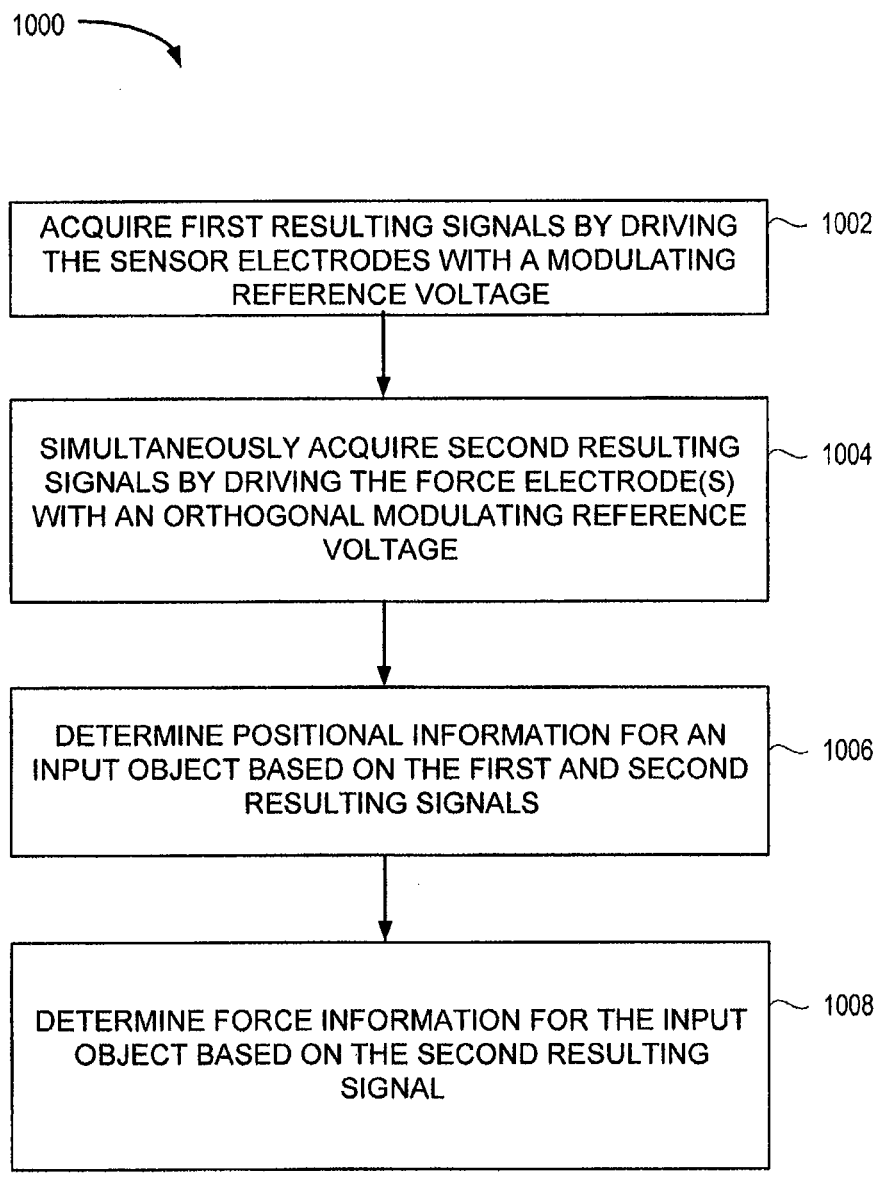
FIG. 10 is a flow diagram illustrating example operations for simultaneous touch and force sensing using in-phase and quadrature demodulation, according to an aspect.

According to certain aspects, the touch signal and the background/baseline signal (e.g., the force signal) can be differentiated from each other (e.g., detected or separately sensed) on a localized per-sensor (e.g., per touch pixel) basis FIG. 10 is a flow diagram illustrating example operations 1000 for simultaneous touch and force sensing using in-phase and quadrature (I/Q) demodulation, according to an aspect. The operations 1000 can be performed by the processing system 110 described above to simultaneously and independently determine both force information and position information for an input object interacting with the input device 100.

The operations 1000 begins at step 1002, where the processing system 110 acquires first resulting signal by driving the sensor electrodes with a capacitive sensing signal. For example, the processing system 110 acquires first resulting signals by driving a plurality of sensor electrodes with a modulated reference voltage, the plurality of sensor electrodes disposed between an input surface of the input device and a force electrode and configured to deflect toward the force electrode in response to a force applied to the input surface.

At step 1004, the processing system 110 acquires (e.g., simultaneously) second resulting signals by driving the force electrode(s) with an additional orthogonal capacitive sensing signal. According to certain aspects, the force electrode is disposed between the input surface and a system ground.

At step 1006, the processing system 110 determines positional information for an input object based on the first and second resulting signals. According to certain aspects, the processing system 110 demodulates the first and second resulting signals to determine an in-phase component (e.g., an in-phase or quadrature component) of each of the first resulting signals indicating changes in capacitance of the plurality of sensor electrodes and of the second resulting signal indicating a change in capacitance of the force electrode.

At step 1008, the processing system 110 determines force information for an input object based on the second resulting signals. According to certain aspects, the processing system 110 demodulates the second resulting signals to determine a quadrature component of the second resulting signal indicating a change in capacitance of the force electrode.

In aspects, the quadrature demodulation gives an independent force measurement. An independent and simultaneous touch measurement is obtained by subtracting the force measurement from the in-phase demodulation.

The embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the disclosure to the precise form disclosed.

In view of the foregoing, the scope of the present disclosure is determined by the claims that follow.

We claim:

1. A processing system for an input device, comprising:
sensor circuitry configured to:
acquire first resulting signals by driving a plurality of sensor electrodes with a first modulated voltage, the plurality of sensor electrodes disposed between an input surface of the input device and a force electrode and configured to deflect toward the force electrode in response to a force applied to the input surface; and
acquire a second resulting signal, while the plurality of sensor electrodes are driven with the first modulated voltage, by driving the force electrode with a second modulated voltage, wherein the second modulated voltage is partially out of phase with respect to the first modulated voltage; and
a determination module, coupled to the sensor circuitry, configured to:
determine positional information for an input object based on the first and second resulting signals; and
determine force information for the input object based on the second resulting signal.

2. The processing system of claim 1, wherein the second modulated voltage is orthogonal in frequency or phase to the first modulated voltage.

3. The processing system of claim 1, wherein:
the first modulated voltage comprises a carrier signal modulated based on a first digital code and the second modulated voltage comprises the carrier signal modulated based on a second digital code, and
the first digital code is orthogonal to the second digital code.

4. The processing system of claim 1, wherein the determination module is configured to:
determine the force information for the input object by demodulating the second resulting signal to determine a quadrature component of the second resulting signal; and
determine the positional information for the input object by demodulating the first and second resulting signals to determine an in-phase component of the first and second resulting signals.

5. The processing system of claim 1, wherein the force electrode comprises an internal chassis of the input device.

6. The processing system of claim 1, wherein:
the force electrode is disposed between the input surface and a system ground; and
the force electrode comprises a conductive sheet.

7. The processing system of claim 1, wherein the sensor circuitry is configured to drive the plurality of sensor electrodes with the first modulated signal by driving the plurality of sensor electrodes for absolute capacitive sensing.

8. The processing system of claim 1, wherein the input device is integrated with a display, and wherein each of the plurality of sensor electrodes comprises at least one display electrode of a plurality of display electrodes configured for display updating and capacitive sensing.

9. The processing system of claim 1, wherein the plurality of sensor electrodes is a first plurality of sensor electrodes, and wherein the processing system further comprises a second plurality of sensor electrodes disposed between the first plurality of sensor electrodes and the input surface.

10. An input device, comprising:
an input surface;
a force electrode;
a plurality of sensor electrodes disposed between the input surface and the first force electrode and configured to deflect toward the force electrode in response to a force applied to the input surface; and
a processing system coupled to the plurality of sensor electrodes and the force electrode, the processing system configured to:
acquire first resulting signals by driving the plurality of sensor electrodes with a first modulated voltage;
acquire a second resulting signal, while the plurality of sensor electrodes are driven with the first modulated voltage, by driving the force electrode with a second modulated voltage, wherein the second modulated voltage is partially out of phase with respect to the first modulated voltage;
determine positional information for an input object based on the first and second resulting signals; and
determine force information for the input object based on the second resulting signal.

11. The input device of claim 10, wherein the second modulated voltage is orthogonal in frequency or phase to the first modulated voltage.

12. The input device of claim 10, wherein:
the first modulated voltage comprises a carrier signal modulated based on a first digital code and the second modulated voltage comprises the carrier signal modulated based on a second digital code, and
the first digital code is orthogonal to the second digital code.

13. The input device of claim 10, wherein the processing system is configured to:
- determine the force information for the input object by demodulating the second resulting signal to determine a quadrature component of the second resulting signal; and
- determine the positional information for the input object by demodulating the first and second resulting signals to determine an in-phase component of the first and second resulting signals.

14. The input device of claim 10, wherein the force electrode comprises an internal chassis of the input device.

15. The input device of claim 10, wherein:
- the force electrode is disposed between the input surface and a system ground; and
- the force electrode comprises a conductive sheet.

16. A method of operating an input device, comprising:
- acquiring first resulting signals by driving a plurality of sensor electrodes with a first modulated voltage, the plurality of sensor electrodes disposed between an input surface of the input device and a force electrode and configured to deflect toward the force electrode in response to a force applied to the input surface;
- acquiring a second resulting signal, while the plurality of sensor electrodes are driven with the first modulated voltage, by driving the force electrode with a second modulated voltage, wherein the second modulated voltage is partially out of phase with respect to the first modulated voltage;
- determining positional information for an input object based on the first and second resulting signals; and
- determining force information for the input object based on the second resulting signal.

17. The method of claim 16, wherein the second modulated voltage is orthogonal in frequency or phase to the first modulated voltage.

18. The method of claim 16, wherein:
- the first modulated voltage comprises a carrier signal modulated based on a first digital code and the second modulated voltage comprises the carrier signal modulated based on a second digital code, and
- the first digital code is orthogonal to the second digital code.

19. The method of claim 16, wherein:
- the force information for the input object is determined by demodulating the second resulting signal to determine a quadrature component of the second resulting signal; and
- the positional information for the input object is determined by demodulating the first and second resulting signals to determine an in-phase component of the first and second resulting signals.

20. The method of claim 16, wherein the force electrode comprises an internal chassis of the input device.

* * * * *